United States Patent [19]

Jonelis

[11] E Patent Number: Re. 32,767

[45] Reissued Date of Patent: Oct. 18, 1988

[54] ELECTROSTATIC PRECIPITATOR CONSTRUCTION HAVING LADDER BAR SPACERS

[76] Inventor: John A. Jonelis, 304 Lancaster Dr., Crystal Lake, Ill. 60014

[21] Appl. No.: 689,330

[22] Filed: Jan. 7, 1985

Related U.S. Patent Documents

Reissue of:

[64] Patent No.: 4,479,813
Issued: Oct. 30, 1984
Appl. No.: 445,260
Filed: Nov. 29, 1982

[51] Int. Cl.[4] ..... B03C 3/08; B03C 3/47

[52] U.S. Cl. ..... 55/137; 55/145; 55/154

[58] Field of Search ..... 55/112, 109, 137, 140, 55/143, 145, 154, 440

[56] References Cited

U.S. PATENT DOCUMENTS

| | | | |
|---|---|---|---|
| 1,600,496 | 9/1926 | Weiskopf | 55/140 X |
| 3,086,341 | 4/1963 | Brandt | 55/112 |
| 4,007,023 | 2/1977 | Batza et al. | 55/143 X |

FOREIGN PATENT DOCUMENTS

| | | | |
|---|---|---|---|
| 566171 | 9/1975 | Switzerland | 55/145 |

*Primary Examiner*—Kathleen J. Prunner
*Attorney, Agent, or Firm*—Anthony S. Zummer

[57] ABSTRACT

The present invention relates to an improved construction for an electrostatic precipitator having ladder bar spacers. The electrostatic precipitator collects solid particles carried by a flue gas from a source of combustion. The precipitator includes a plurality of spaced plates for collecting solid particles from the flue gas by electrostatic attraction of the solid particles to the plates. A second plurality of elongated electrodes is positioned among the plates. Each of the electrodes is mounted between a pair of adjacent plates. Each of the electrodes is parallel to the other electrodes and is parallel to the plates. A third plurality of ladder bars is positioned between adjacent plates to hold the plates in a flat attitude and to maintain adjacent surfaces of adjacent plates substantially equidistantly spaced from one another. Each of the ladder bars has a connector bar secured to one of the pair of adjacent surfaces. Each of the ladder bars has a fourth plurality of holder bars. Each of the holder bars having one end connected to its respective connector bar and extending outwardly from the connector bar toward the other of the pair of adjacent surfaces. A contact on the other end of each holder bar engages the other of the pair of adjacent surfaces to hold the pair of adjacent surfaces apart.

8 Claims, 5 Drawing Sheets

FIG. 5
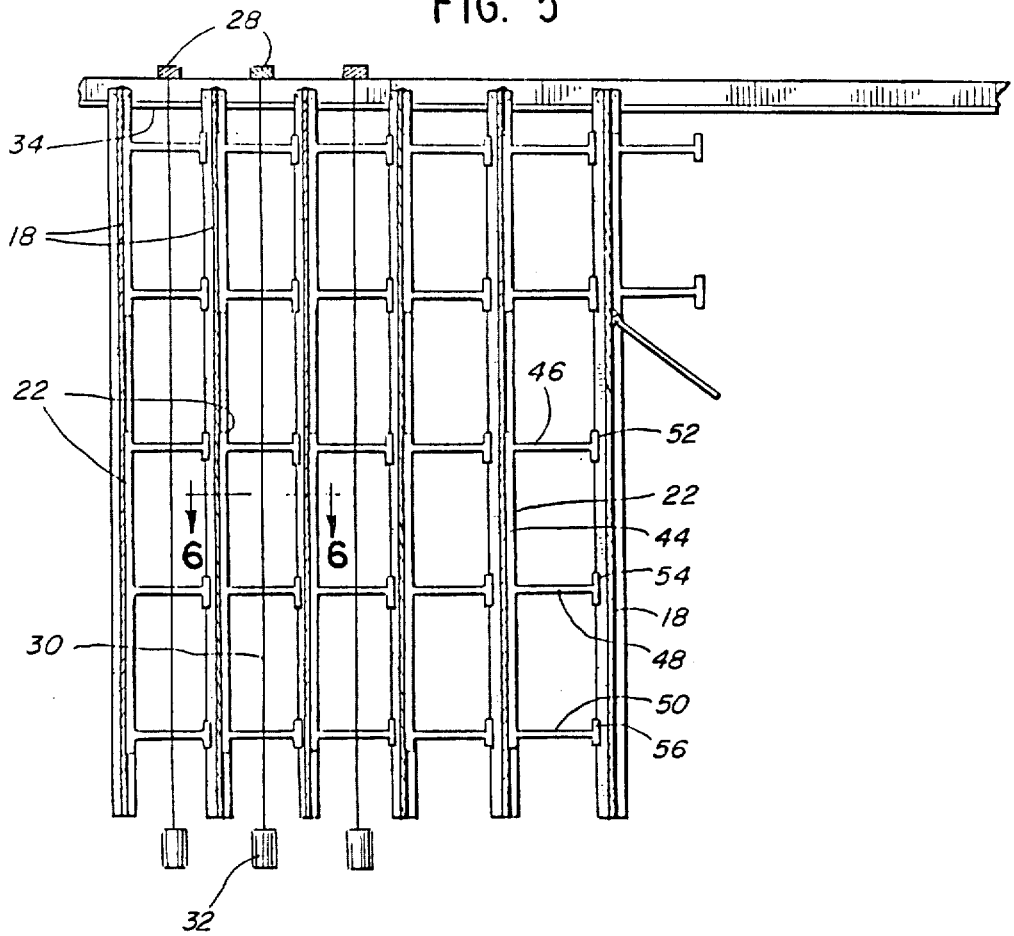
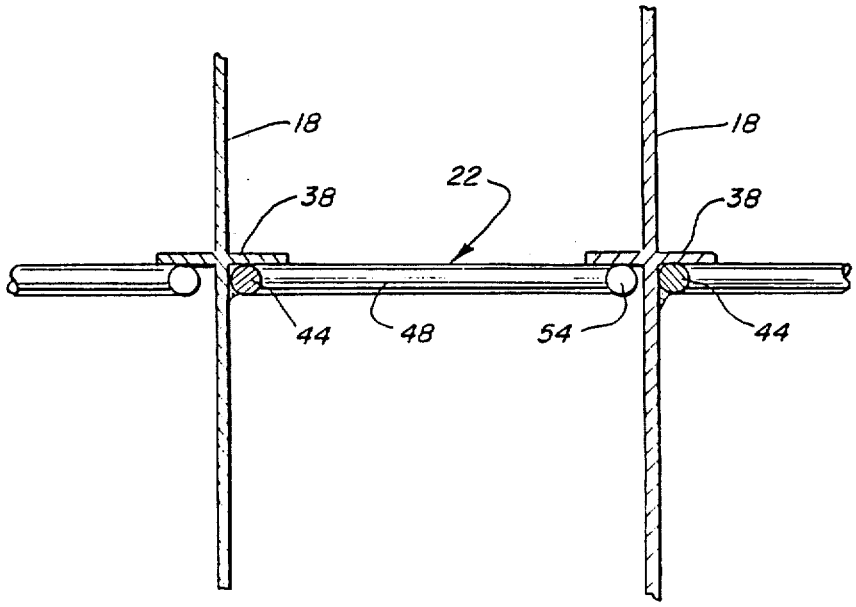
FIG. 6

FIG. 7
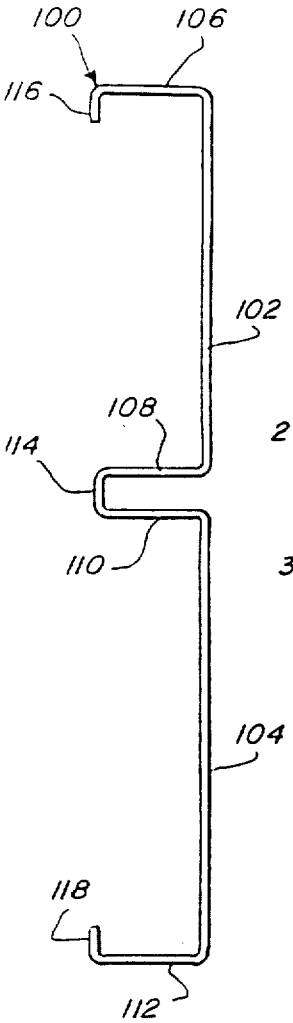
FIG. 8
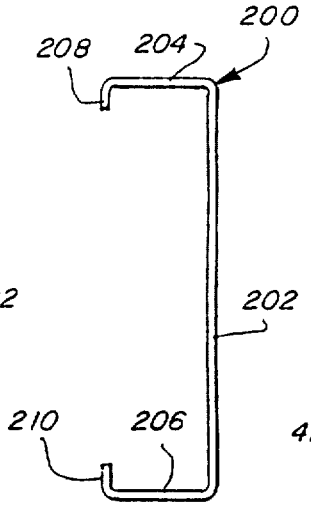
FIG. 10
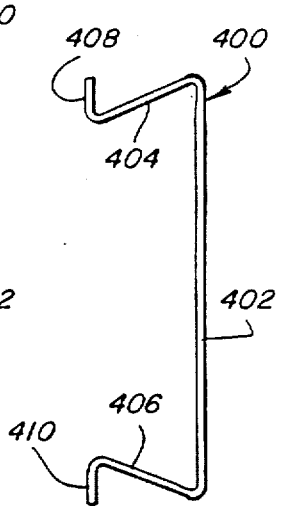
FIG. 12
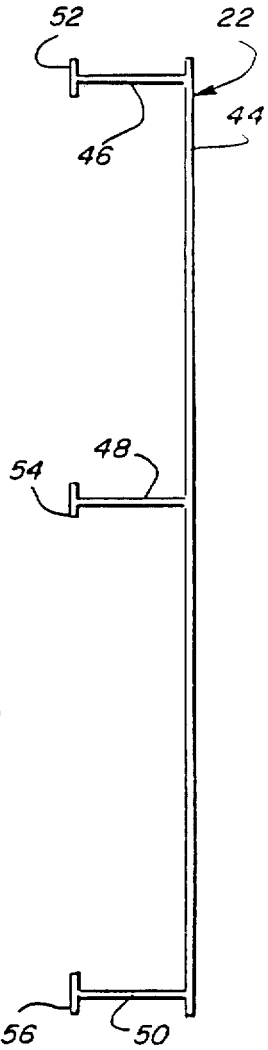
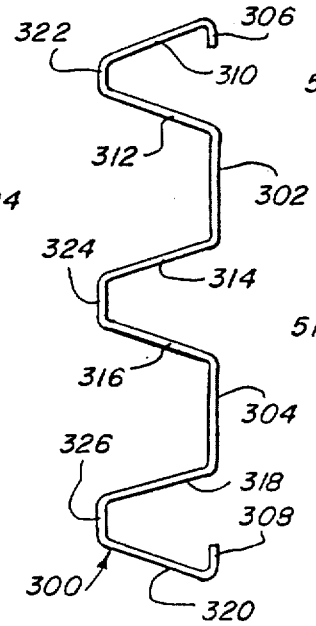
FIG. 9
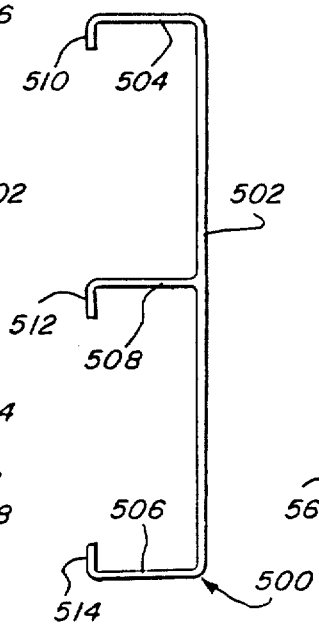
FIG. 11

ELECTROSTATIC PRECIPITATOR CONSTRUCTION HAVING LADDER BAR SPACERS

Matter enclosed in heavy brackets [ ] appears in the original patent but forms no part of this reissue specification; matter printed in italics indicates the additions made by reissue.

BACKGROUND OF THE INVENTION

A commonly accepted practice of removing solid particles from a flue gas includes the utilization of an electrostatic precipitator to hold the solid particles without inhibiting the flow of the flue gas. Typically, an electrostatic precipitator is positioned in the flue between the outlet of a boiler and a smokestack.

The ordinary construction of an electrostatic precipitator includes a plurality of large, flat, metal plates which are spaced from each other. The metal plates may have a height of up to 30 feet or more, and a width of up to 10 feet or more. It is to be appreciated that the specific size of the plates in a given precipitator is dependant upon the particular precipitator construction for a given application. Ideally, the flat plates are equidistantly spaced from each other. A second plurality of elongated electrodes is positioned among the plates. The electrodes are positioned between each pair of adjacent plates. The elongated electrodes are equidistantly spaced from adjacent plates.

The uniform spacing of the elongated electrodes from the plates is necessary to have a uniform electrostatic charge between the elongated electrodes and the plates. A uniform electrostatic charge generates uniform collection of solid particles on the plates. Typically, the solid particles are removed from the plates by rapping the plates to vibrate the plates and, thereby, cause the collected solid particles to drop off of the plates in clusters into collectors under the plates.

The flue gas which enters the electrostatic precipitator is hot. Commonly, additional heat enters the precipitator in the form of fires caused by problems in the operation of the boiler. The continual exposure of the plates to heat causes the plates to warp or buckle. The warping or buckling of the plates destroys the uniform spacing between adjacent surfaces of adjacent plates and uniform spacing between each of the elongated electrodes and the respective adjacent plates. Thereby, the effectiveness of the precipitator in removing solid particles from a flue gas is reduced so that the precipitator has a lower capacity. Consequently, the capacity of the boiler, which produces the flue gas, must also be lowered to comply with emissions regulations. In the case of a power generation unit, as the capacity of the boiler is reduced, the capacity of a power generating system connected to the boiler is also reduced. In order to maintain an electrostatic precipitator fully effective, it is desirable to maintain the spaced plates of the precipitator in an equidistantly spaced relationship to each other and to the electrodes.

One apparatus for holding electrostatic precipitator plates in an equidistantly spaced relationship is taught in U.S. Pat. No. 4,007,023, issued Feb. 8, 1977, to Batza et el, entitled "Electrostatic Precipitator With Collector-electrode Spacers." The Batza et el patent discloses spacer construction for use between adjacent collecting electrode strips to hold the strips apart an equal distance from each other. Each spacer includes a bracket which is fixed to one of the strips. A spacer body is connected to the bracket by a pivot. A second bracket is fixed to a second electrode strip. The spacer body includes a slot for receiving the second bracket. The Batza et el device is expensive to manufacture and difficult to install, since the two brackets must be perfectly aligned on facing surfaces. Furthermore, the Batza spacer provides many sharp edges which create localized electrostatic charges to distort the electrostatic field around the strips thereby reducing tne effectiveness of the electrostatic precipitator. Another known spacer is one which has an "H" bar construction. This spacer has several disadvantages in that the spacer is made up of three seperate pieces which are welded together. In particular, it has been found that there is sufficient variation in size of the spacers to create a misalignment of the plates. The variation in size cannot be adapted in the field. Furthermore, each spacer must be mounted on its respective surface individually.

SUMMARY OF THE INVENTION

The subject matter of this invention is an electrostatic precipitator for collecting solid particles carried by a flue gas from a source of combustion. The precipitator includes a plurality of spaced parallel plates for collecting solid particles by electrostatic attraction of the solid particles to the plates. A second plurality of elongated electrodes is mounted between adjacent plates. Each of the elongated electrodes is parallel to the other electrodes and to the plates. The elongated electrodes are equidistantly spaced between the plates. A third plurality of ladder bars is positioned between adjacent plates to hold the plates in a flat attitude and to maintain adjacent surfaces of the plates equidistantly spaced from one another. Each of the ladder bars has a connector bar secured to a pair of adjacent surfaces. A fourth plurality of holder bars is connected to each connector bar at one end of each of the holder bars. The holder bars extend outward and away from the connector bar toward the other of the pair of adjacent surfaces. A contact is connected to the other end of each holder bar abutting the other of the pair of adjacent surfaces to hold the pair of adjacent surfaces in a spaced relationship.

BRIEF DESCRIPTION OF THE DRAWINGS

FIG. 5 is a side elevational view of a plurality of plates showing the positioning of the ladder bars on the plates;

FIG. 6 is an enlarged cross sectional view taken on line 6—6 of FIG. 5;

FIG. 7 is a side elevational view of a multiple holder bar ladder bar;

FIG. 8 is a side elevational view of a double "U" ladder bar:

FIG. 9 is a side elevational view of a ladder bar having a plurality of holder bars;

FIG. 10 is a side elevational view of a double "Z" ladder bar;

FIG. 11 is a triple "U" ladder bar; and

FIG. 12 is a side elevational view of a ladder bar having triple holder bars.

DESCRIPTION OF THE PREFERRED EMBODIMENT

Figure 1:
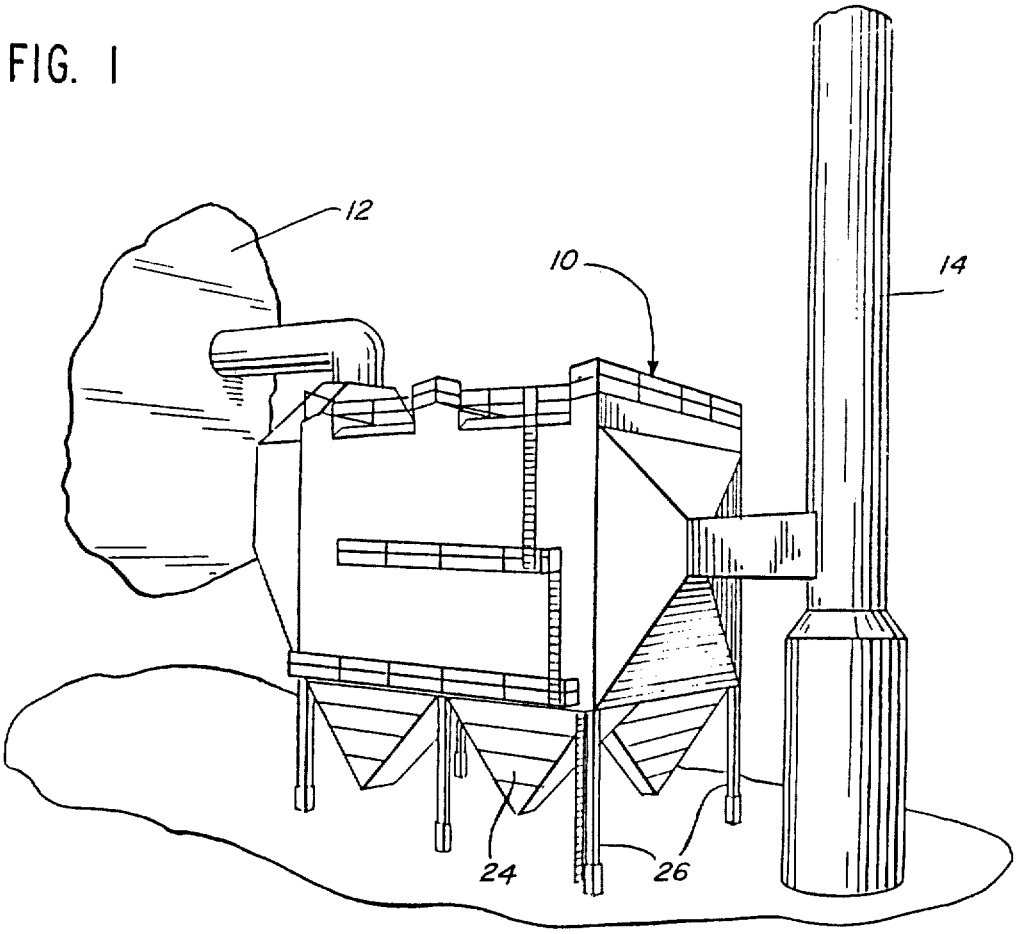
FIG. 1 is a perspective view of an electrostatic precipitator embodying the herein described invention positioned between a boiler and a smokestack.

Referring now to the drawings and especially to FIG. 1, an electrostatic precipitator embodying the herein disclosed invention is generally indicated by numeral 10. The precipitator is mounted in a flue between a conventional boiler 12 and a conventional smokestack 14. Looking now to FIG. 2, it may be seen that the precipitator includes a housing 16 with a plurality of identical spaced flat metal plates 18 mounted in the housing. A second plurality of elongated electrodes 20 is positioned between the plates. A third plurality of ladder bars 22, is mounted on plates 18 to maintain the plates in a uniform spaced relationship and to flatten those plates which are warped or buckled.

Electrodes 20 and plates 18 are connected to a conventional source of an electrostatic charge which is not shown herein. As is well known in the art, the source of the electrostatic charge creates an electrostatic charge on the electrodes and an opposite electrostatic charge on the plates so that solid particles carried by the flue gas are attracted to plates 18. As is conventional, the cleansed flue gas then flows to smokestack 14.

The construction of the electrostatic precipitator is conventional in that the electrostatic precipitator housing 16 has its inlet connected to boiler 12. The housing is enclosed and has its outlet connected to smokestack 14. The bottom of housing 16 includes a plurality of collector hoppers 24, which are adapted to receive the solid particles which are collected on the plates. The hoppers are opened at their respective bottoms to discharge the collected solid particles from the housing. Housing 16 includes a plurality of legs 26 to support the precipitator.

A high tension frame 28 is mounted in housing 16. The frame 28 is conventional in its construction and is connected to the source of electrostatic charge. The elongated electrodes 20 are mounted on frame 28. Each of the electrodes 20 is a single metallic electrically conductive wire 30 with a weight 32 secured to the end of the wire to hold the wire taut and perfectly perpendicular to the horizontal. Since each of the electrodes 20 is taut by its respective weight, all of the electrodes are parallel to each other. A lower high tension frame (not shown) restrains the wire weights in place to prevent movement. This frame is conventoinal in its design.

The precipitator includes a plurality of plate support rails 34 commonly known as anvil beams, mounted within housing 16. Plates 18 are mounted between adjacent rails 34. Each plate 18 includes a metallic electronically conductive collector surface 36 with a plurality of stiffeners 38 formed in the plate to make the plate rigid. A pair of ears 40 is fixed to the upper portion of each of the collector surfaces to provide a means for supporting the respective plate on rails 34. A plurality of side spacer bars 42 is secured to the ends of the plates to hold the plates in a selected spaced relationship relative to each other.

Figure 3:
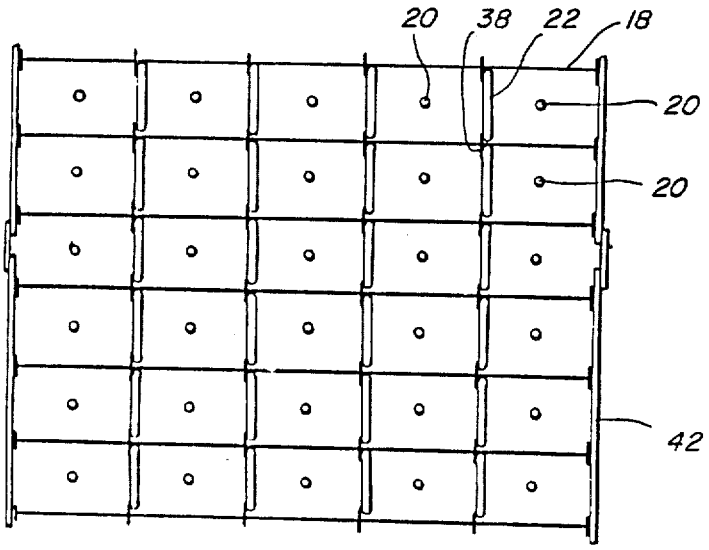
FIG. 3 is a plan view of a portion of the precipitator of FIG. 2 taken on line 3—3 of FIG. 2 showing the relative positioning of plates and elongated electrodes with ladder bars between adjacent plates.

As my be seen in FIG. 3, the plates are regularly spaced from each other and a plurality of electrodes is positioned between a pair of adjacent plates. The electrodes are equidistantly spaced between the plates.

In a new installation, the plates and electrodes are equidistantly and regularly spaced as shown in FIG. 3. However, after a prolonged usage of the precipitator, the plates tend to warp and buckle. The resulting disperity in the distance between adjacent plates and electrodes reduces the effectiveness of the precipitator. In order to bring the precipitator back to its original effectiveness and in some instances provide an improved capacity, ladder bars 22 are positioned between adjacent surfaces of adjacent plates to straighten the plates and to equalize the distance between adjacent surfaces of adjacent plates.

Referring now to FIG. 12, ladder bar 22 is shown therein. Ladder bar 22 includes an elongated connector bar 44 which has a circular cross section. The ends of the connector bar are rounded. Three holder bars 46, 48 and 50 are fixed to the connector bar 44. Holder bars 46 and 50 are positioned adjacent to the ends of the connector bar. Holder bar 48 is positioned midway between holder bars 46 and 50. Each of the holder bars 46, 48, and 50, has one end welded to connector bar 44. Holder bars 46, 48, and 50, are each perpendicular to the connector bar and are parallel to each other. Each of the holder bars 46, 48, and 50, is a metallic bar having a circular cross section. Contacts or terminal portions 52, 54, and 56 are fixed to the other end of each of the holder bars 46, 48, and 50, respectively. Each of the contacts is welded to its respective holder bar. Contacts 52, 54, and 56 are perpendicular to the respective holder bars, and the contacts are in line. The contacts are parallel to the connector bar. Each of the contacts or terminal portions is a metallic bar having a circular cross section. Each end of each contact is rounded so that all of the ends of the ladder bar 22 are rounded.

Figure 4:
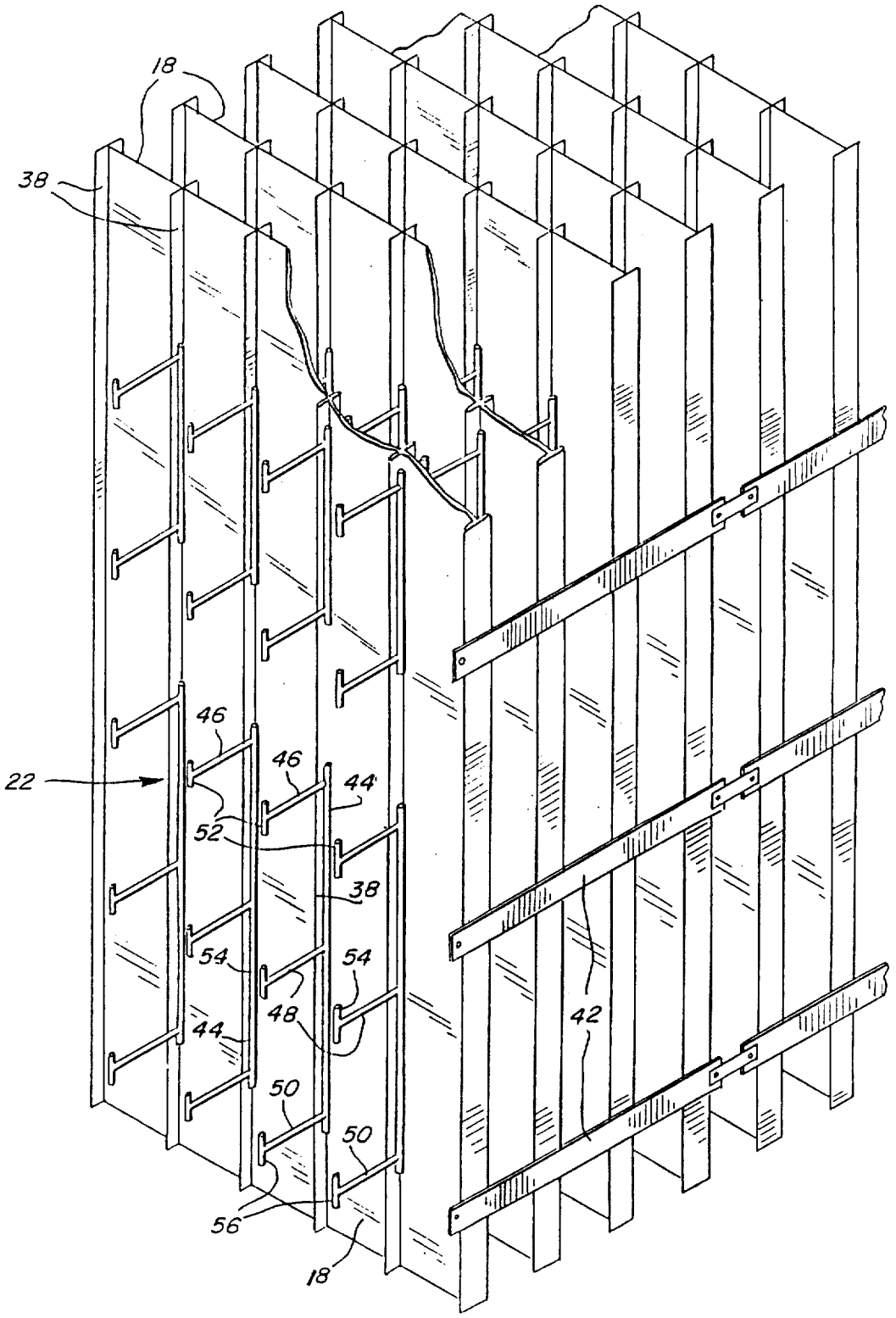
FIG. 4 is a fragmentary enlarged perspective view of a plurality of plates of the electrostatic precipitator of FIG. 2 showing ladder bars mounted between adjacent plates.

As may be seen in FIG. 5, each of the ladder bars is fixed to one surface of a pair of opposed parallel surfaces of a pair of plates. Each ladder bar has its connector bar welded to a plate in an attitude wherein the holder bars are perpendicular to the respective plate. When all of the required ladder bars are mounted on a given surface of a plate, the adjacent plate is then placed into the engagement with the contacts of the ladder bars. In the event that the adjacent plate is warped so that the plate bows toward the ladder bars, the weight of the plate creates a moment which applies a force against the ladder bars to straighten the plate. Once the adjacent plate is positioned, additional ladder bars are mounted on the other side of that adjacent plate. The additional plates have ladder bars spaced in line with the other ladder bars as shown in FIGS. 3, 4, and 5. The positioning of the ladder bars in line means that the forces are applied to the plates at the stiffiners where the ladder bars are secured to the respective plates.

Positioning of a plurality of ladder bars on one plate provides a means for holding an adjacent plate at a selected distance from the one plate even if one or both of the plates are warped or buckled. The weight of the plates causes the plates to be straightened, but the ladder bars hold adjacent plates apart a set distance. The present construction has one end of each holder bar secured to a plate, but the other end is free to move relative to the abutting plate. The plates are substantially straightened when all of the plates are interconnected between ladder bars abutting the adjacent plates of each pair of adjacent plates.

Figure 2:
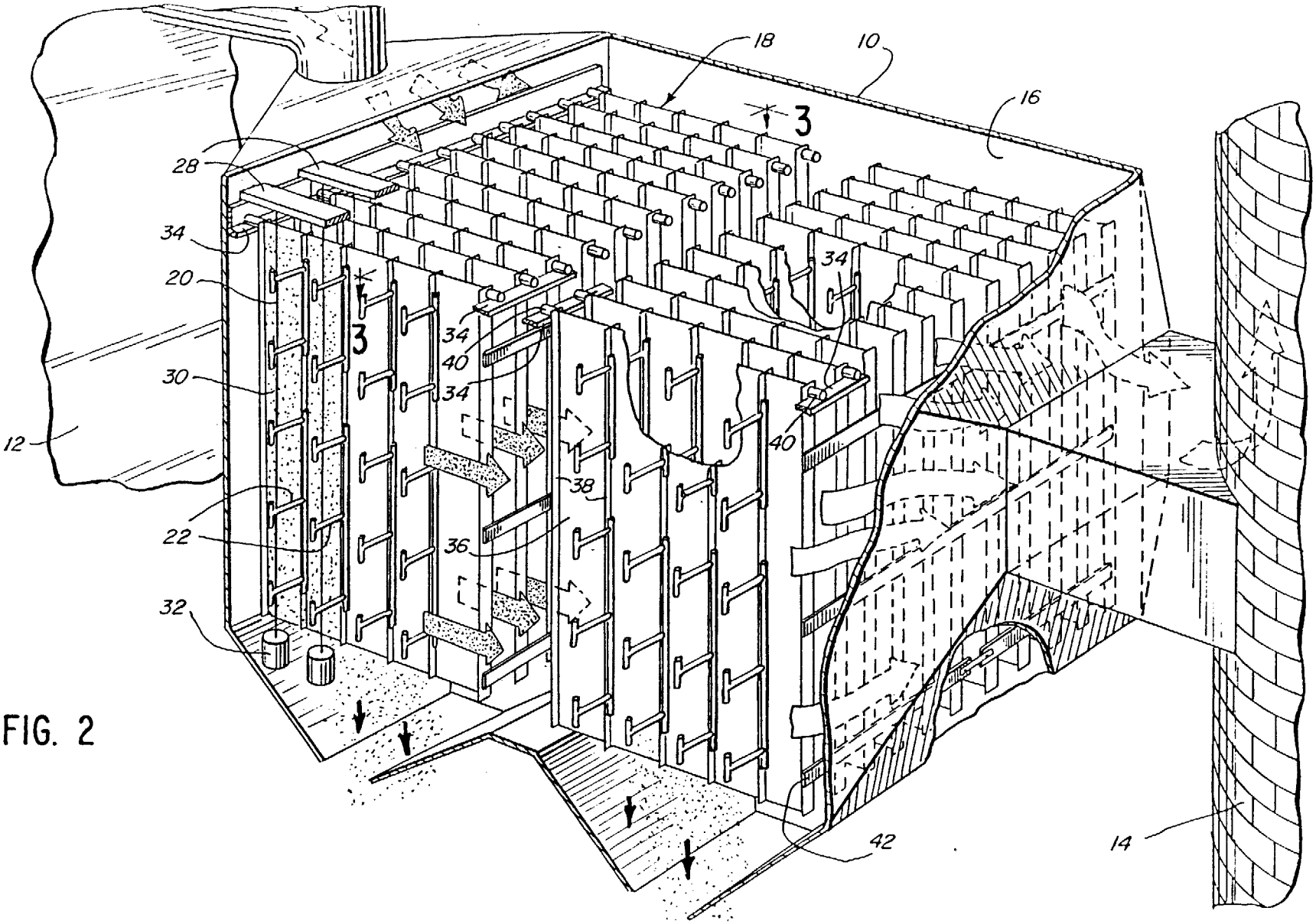
FIG. 2 is an enlarged fragmentary broken-away perspective view of the electrostatic precipitator shown in FIG. 1 showing a plurality of spaced plates and ladder bars attached to certain of the plates to maintain the plates in a uniform spaced relationship.

In the event that the length of the ladder bar 22, with three holder bars, is too long for one of the plates, it is readily apparent that the connector bar may be cut off adjacent to intermediate holder bar 48 and only two holder bars are used. Such an application is shown in FIGS. 2 and 5 to demonstrate that the ladder bar may be easily adapted for any application. It is to be appreciated that all of these repairs are done on site, that is, at the location of the precipitator. Due to errors in inventory or planning, the proper size ladder bars may not be readily available thus, the longer ladder bars may be cut to size at a given application.

Looking now to FIG. 7, a double "U" spaced ladder bar 100 is shown therein. Ladder bar 100 includes a noncontinuous connector bar which has two portions 102 and 104. A holder bar 106 is formed integral with one end of portion 102 of the connector bar. A holder bar 108 is formed integral with the other end of portion 102. A third holder bar 110 is formed integral with one end of portion 104, and a holder bar 112 is formed integral with the other end of portion 104. An intermediate contact 114 is formed integral with the ends of holder bars 108 and 110 connecting holder bars 108 and 110. An end contact 116 is formed integral with one end of holder bar 106, and the contact extends inward toward contact 114. A second end contact 118 is formed integral with holder bar 112 and extends inward toward contact 114. Holder bars 106 and 108 are perpendicular to portion 102. Holder bars 110 and 112 are perpendicular to portion 104. The holder bars 106, 108, 110, and 112 are all parallel to each other. Contacts 114, 116, and 118 are in line and are parallel to portions 102 and 104. The entire ladder bar 110 is a unitary metallic rod having a circular cross section. The ladder bar is formed of a single metal rod. The ends of the rod which form the ends of contacts 116 and 118 are rounded portions. Ladder bar 100 is utilized in the same manner as ladder bar 22, in that portions 102 and 104 of the connector bar are welded to a surface of a plate with holder bars 106, 108, 110, and 112 perpendicular to that surface.

Referring now to FIG. 8, a double "U" shaped ladder bar 200 is shown therein. Ladder bar 200 includes a elongated straight connector bar 202 which has a holder bar 204 formed integral with one end, and a holder bar 206 formed integral with the other end. The holder bars 204 and 206 are each perpendicular to connector bar 202 and are parallel to each other. A contact 208 is formed integral with holder bar 204, and a contact 210 is formed integral with holder bar 206. Contacts 208 and 210 are perpendicular to holder bars 204 and 206, respectively. Contacts 208 and 210 are in line. Each of the contacts has a rounded end portion. From the foregoing, it may be seen that the ladder bar 200 may be readily formed from a single metallic rod having a circular cross section. The bar is simply bent to shape.

Referring now to FIG. 9, ladder bar 300 is shown therein. Ladder bar 300 includes an intermittent connector bar, which includes a pair of internal portions 302 and 304 which are in line with each other. A spaced end portion 306 is in line with portion 302 as is a spaced end portion 308. A holder bar 310 has one end formed integral with one end of portion 306. Another holder bar 312 has one end formed integral with one end of portion 302, while another holder bar 314 has one end formed integral with the other end of portion 302. A holder bar 316 has one end formed integral with portion 304 and another holder bar 318 is formed integral with the other end of portion 304. A holder bar 320 has one end formed integral with portion 308. A contact 322 has one end formed integral with holder bar 310 and the other end formed integral with an end of holder bar 312. A contact 324 has one end formed integral with the other end of holder bar 314, and the other end of the contact is formed integral with holder bar 316. A contact 326 has one end formed integral with holder bar 318 and the other end formed integral with holder bar 320. Contacts 322, 324, and 326 are in line and are parallel to the connector bar.

Ladder bar 300 is formed of a single metallic bar having a uniform circular cross section. The bar is bent to form the appropriate portions of the ladder bar. The ends of the bar which are the ends of portion 306 and 308 are rounded. Ladder bar 300 is used in the same manner as ladder bar 22. Portions of the connector bar are welded to a plate with the plane of the ladder bar being perpendicular to the plate.

Referring now to FIG. 10, a double "Z" ladder bar 400 is shown therein. Ladder bar 400 includes an elongated straight connector bar 402. A holder bar 404 is formed integral with one end of connector bar 402, and a holder bar 406 is formed integral with the other end of connector bar 402. A contact 408 is formed integral with holder bar 404, and a contact 410 is formed integral with holder bar 406. Contacts 408 and 410 are in line and are parallel to connector bar 402. The ends of contacts 408 and 410 are rounded. Ladder bar 400 is formed of a single uniform piece of metallic rod which is bent to a selected shape to form the ladder bar. Ladder bar 400 is used in the same manner as is ladder bar 22.

Referring now to FIG. 11, ladder bar 500 is shown therein. Ladder bar 500 includes a straight elongated connector bar 502. A holder bar 504 is formed integral with one end of the connector bar, and a holder bar 506 is formed integral with the other end of the connector bar. A metallic holder bar 508 is fixed to the connector bar 502 midway between connector bars 504 and 506. Holder bars 504, 506 and 508 are perpendicular to the connector bar and are parallel to each other. A contact 510 is formed integral with holder bar 504. A contact 512 is formed integral with holder bar 508. A contact 514 is formed integral with holder bar 506. Contacts 510, 512, and 514 are in line and are parallel to connector bar 504. The ends of the contacts 510, 512, and 514 are rounded.

Ladder bar 500 is formed by bending a single unitary metallic rod having a uniform circular cross section to form the connector bars 504 and 506 and the respective contacts. A second piece of metallic rod is bent to a shape to form a holder bar 508 with contact 512, and the holder bar is welded to connector rod 502 to complete the ladder rod. Ladder rod 500 is used in the same manner is as ladder bar 22.

Each of the ladder bars 22, 100, 200, 300, 400, and 500 has a connector bar which is attached to the surface of a plate and welded. The ladder bar is positioned on the plate adjacent to and in line with the stiffener on the plate. The plane of each ladder bar is substantially perpendicular to the surface of the plate. The distance between the contacts and the connector bar is substantially equal to the distance between adjacent surfaces of adjacent plates. Since the connector bar is welded to one of the adjacent plates, the contacts abut the adjacent surface of the adjacent plate. As was mentioned above, the plates are fixed into a flattened attitude making the distance between adjacent surfaces uniform. It follows that the equidistantly spaced portions of the elongated electrodes then provide a uniformed positioning relative to the plates. As flue gas flows between the plates and becomes charged by engagement with the electrodes, the solid particles are deposited upon the plates.

The instant invention is described in detail herein and is shown in the accompanying drawings. It is readily apparent that those skilled in the art may make various modifications and changes without departing from the spirit and scope of the herein disclosed invention. It is to be expressly understood that the instant invention is limited only by the appended claims.

What is claimed is:

1. In an electrostatic precipitator for collecting solid particles carried by a flue gas from a source of combustion, said precipitator including a plurality of parallel precipitator plates spaced from and adjacent one another for collecting solid particles by electrostatic attraction of solid particles to the plates, and a second plurality of elongated electrodes mounted between adjacent plates substantially parallel to each other and substantially parallel to the plates, each of said elongated electrodes being substantially equidistantly spaced from adjacent electrodes, the improvement comprising: a third plurality of ladder bars positioned between adjacent plates to hold adjacent surfaces of adjacent plates in an equidistantly spaced relationship, each of said ladder bars having a connector bar secured to one of a pair of the adjacent surfaces, [each of said connector bars having a circular cross section,] and each of said ladder bars having a fourth plurality of holder bars, [each of said holder bars having a circular cross section,] each of the holder bars having one end connected to its respective connector bar and extending outward from the connector bar toward the other of the pair of adjacent surfaces.

2. In an electrostatic precipitator for collecting solid particles carried by a flue gas from a source of combustion as defined in claim 1; wherein each ladder bar is a formed unitary metal rod.

3. In an electrostatic precipitator for collecting solid particles carried by a flue gas from a source of combustion as defined in claim 1; wherein each ladder bar is a metal rod having a circular cross section.

4. In an electrostatic precipitator for collecting solid particles carried by a flue gas from a source of combustion as defined in claim 1; wherein each holder bar has a terminal portion on [the end opposite said one end] *its outward extension*, each of said terminal portions having a circular cross section.

5. In an electrostatic precipitator for collecting solid particles carried by a flue gas from a source of combustion as defined in claim 1; including a contact on the [other end] *outward extension* of each holder bar engageable with the other of the pair of adjacent surfaces.

6. In an electrostatic precipitator for collecting solid particles carried by a flue gas from a source of combustion as defined in claim 5; wherein each contact is formed integral with its respective holder bar.

7. In an elecrostatic precipitator for collecting solid particles carried by a flue gas from a source of combustion as defined in claim 5; wherein each contact is substantially parallel to its respective connector bar.

8. In an electrostatic precipitator for collecting solid particles carried by a flue gas from a source of combustion as defined in claim 1; wherein each holder bar is substantially perpendicular to its respective connector bar.

* * * * *